United States Patent [19]

Biswas

[11] 3,993,333

[45] Nov. 23, 1976

[54] CONNECTOR FOR FLEXIBLE METALLIC RACEWAY

[75] Inventor: Ranjit Biswas, Avenel, N.J.

[73] Assignee: Thomas & Betts Corporation, Elizabeth, N.J.

[22] Filed: July 23, 1975

[21] Appl. No.: 598,430

[52] U.S. Cl. ................................ 285/45; 285/158; 285/382
[51] Int. Cl.² ........................................ F16L 11/12
[58] Field of Search ........... 285/158, 159, 161, 128, 285/192, 194, 205, 45, 382; 174/65 R

[56] References Cited
UNITED STATES PATENTS

| | | | |
|---|---|---|---|
| 2,093,038 | 9/1937 | Douglas | 339/128 X |
| 2,947,800 | 8/1960 | Badeau et al. | 174/65 R |
| 3,366,405 | 1/1968 | Sevrence | 285/162 X |
| 3,814,467 | 6/1974 | Van Buren | 285/162 X |

Primary Examiner—Dave W. Arola
Attorney, Agent, or Firm—David Teschner; Jesse Woldman

[57] ABSTRACT

A snap-in connector for coupling a flexible metallic raceway to an electrical enclosure formed from a shell member, to engage the material about the knock-out in an electrical enclosure, and a core member, to engage, hold and ground a flexible metallic raceway. The core member has a cylindrical central portion about which is positioned an inwardly facing rib in the form of a portion of a helix to engage the voids between the covolutions of the raceway to hold the raceway and provide electrical continuity therewith. The shell member and core member are coupled together and provide a first lip to limit connector insertion into the knock-out and in cooperation with latch means to hold the connector to the material about the knock-out while the latch means prevents withdrawal of the connector from the knock-out.

4 Claims, 14 Drawing Figures

CONNECTOR FOR FLEXIBLE METALLIC RACEWAY

BACKGROUND OF THE INVENTION

1. Field of the Invention

The invention finds utility in the coupling of flexible metallic raceways to electrical enclosures, boxes, tools, appliances or the like to provide support thereto and to provide a good electrical ground between the raceway and electrical enclosure.

2. Description of the Prior Art

Prior art devices often employed rigid bodies, one end of which are threaded for insertion into a knock-out of an electrical enclosure and to which was applied a lock nut suitably tightened thereon. When the box was crowded it was difficult to apply the locknut and to tighten same. As an alternative, split bodied connectors were used. A screw used to grasp the flexible metallic raceway passing through the connector expanded the split halves of the body to cause the wall of the enclosure to be trapped between adjacent, parallel shoulders. If the two connector halves failed to separate evenly, or distorted, the connector could be tightly applied to the raceway but the raceway not anchored to the enclosure.

The screw mechanism used to engage and lock the connector to the raceway often distorted the raceway and impaired its use. Other devices employed collapsible rings to grip the raceway and required gland nuts, pressure rings and other involved mechanisms all of which required tools for proper installation and which often required all parts to be coupled at a single time as in the screw operated connector described above.

SUMMARY OF THE INVENTION

The present invention overcomes the difficulties noted above with respect to prior art devices by providing a non-tool applied connector for coupling a flexible metallic raceway to an electrical enclosure or the like which can be installed simply and easily without disturbing the raceway, conductors passing through the raceway or the contents of the enclosure. The connector, in a first form, is made up of a shell constructed from plastic or similar insulating, flexible material in the form of a cylinder having a closed end through which is passed a selected aperture and a fully open end having thereabout an outwardly directed lip, the free end of which is made to contact the material of the enclosure about the knock-out in which the connector is placed. The lip, as will become evident, operates to insure the proper locking of the connector in the knock-out and also prevents the connector from being inserted too far into the enclosure. A plurality of windows extend through the cylindrical walls of the shell at regular intervals about the periphery.

A core member constructed of metal has a central cylindrical portion bounded by an inturned rib which projects into and partly blocks the longitudinal passageway through the cylindrical portion. The rib portion defines at least a portion of a helix to engage the voids between the convolutions of a flexible metallic raceway. The rib extending over the outer surface of the raceway. The remainder of the core member consists of latching fingers which extend throguh associated windows in the shell and latch the core member to the shell and tongue means which extend through associated windows in the shell to engage the material about the knock-out of the electrical enclosure in which the connector is placed. Thus, the wall of the enclosure is trapped between the free ends of the tongues and the free end of the lip, the lip keeping the tongues in contact with the material due to its flexibility. Stops on the tongues limit their outward extention and prevent unwanted withdrawal of the connector by deforming the tongues.

In a second embodiment, the core member has an outwardly facing rib which engages the voids between the convolutions on an interior surface of the flexible metallic raceway. The core member is rolled over where it extends through the shell, this time made of metal, and may, if desired, be fitted with a throat to prevent injury to the insulation of conductors passed through the connector. The shell has segmented top flaps to act as the lip to contact one surface of the enclosure and discrete flaps adjacent the second surface to lock the connector to the enclosure. It is therefore an object of this invention to provide a simple connector for coupling a flexible metallic raceway to an electrical enclosure or the like.

It is another object of this invention to provide a non-tool applied connector for coupling a flexible metallic raceway to an electrical enclosure or the like.

It is another object of this invention to provide a novel connector for coupling a flexible metallic raceway to an electrical enclosure or the like which can be installed from outside of the enclosure.

It is another object of this invention to provide a novel connector for coupling a flexible metallic raceway to an electrical enclosure or the like which can be independently installed to the raceway and to the enclosure.

It is another object of this invention to provide a novel connector for a flexible metallic raceway which engages the exterior of the raceway.

It is yet another object of this invention to provide a novel connector for a flexible metallic raceway which the interior of the raceway.

It is still another object of this invention to provide a novel connector for a flexible metallic raceway which snaps into a knock-out of an enclosure and provides engagement with an electrical ground continuity between the raceway and enclosure.

Other objects and features of the invention will be pointed out in the accompanying description and claims and illustrated in the accompanying drawings, which disclose, by way of example, the principles of the invention, and the best modes which have been contemplated for carrying them out.

BRIEF DESCRIPTION OF THE DRAWINGS

In the drawings in which similar elements are given similar reference characters.

DESCRIPTION OF THE PREFERRED EMBODIMENTS

Figure 1:
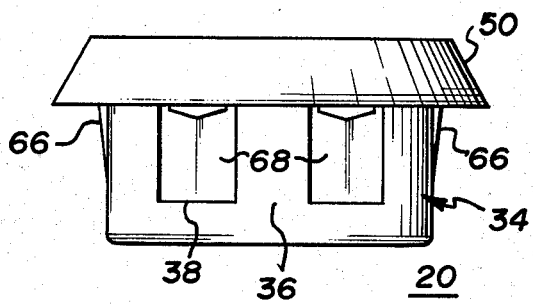
FIG. 1 is a side elevation of a connector constructed in accordance with the concepts of the invention.
Figure 2:
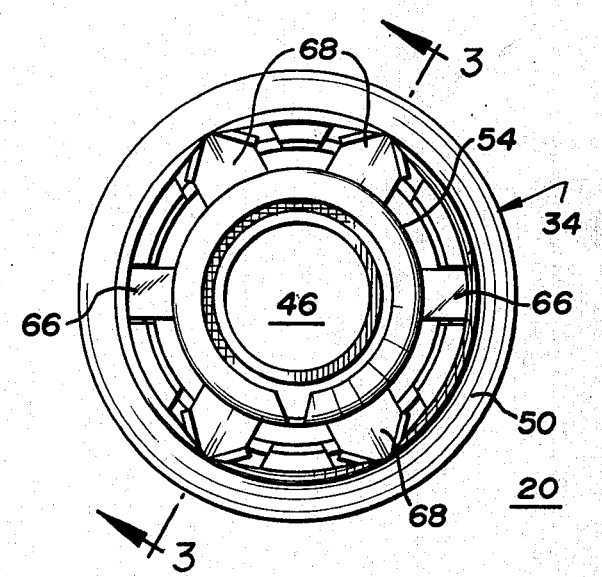
FIG. 2 is a top plan view of the connector of FIG. 1.
Figure 3:
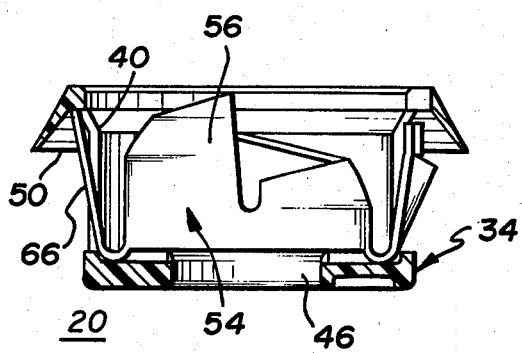
FIG. 3 is a side elevation of the connector of FIG. 2 taken along the line 3—3.

Turning now to FIGS. 1 to 11, a first embodiment of a connector 20 for coupling a flexible metallic raceway 22 to an electrical enclosure 24 or the like (See FIG. 11) is shown. The connector 20 is passed through a knock-out 26 in such enclosure which permits individual conductors 28 to be passed to the enclosure interior. The raceway is made up of a series of convolutions 30 separated by voids 32. The interior is similarly made up of a series of convolutions separated by voids (not shown).

The connector 20 consists of a shell 34 having a generally cylindrical body portion 36 (see FIG. 9) containing a first series of windows 38 which will receive locking tongues, as will be described below, and a second series of windows 40 which will receive latching members. A bottom 42 substantially closes the shell 34 at a first end 44 (see FIG. 10) and contains an aperture 46 so that conductors 28 in raceway 22 can be passed into the enclosure 24. At the second end 48 of the shell 34 is an outwardly and downwardly directed lip 50. The free end 52 of the lip 50 is directed downwardly towards the first end 44 of the shell 34. The free end 52 of the lip 50 will bear upon the outer surface 25 of the enclosure 24 wall and due to its resilience and flexibility will assure contact with the locking tongues, as will be described below. The lip 50 also prevents the connector 20 from passing through knock-out 20 entirely into enclosure 24.

Figure 4:
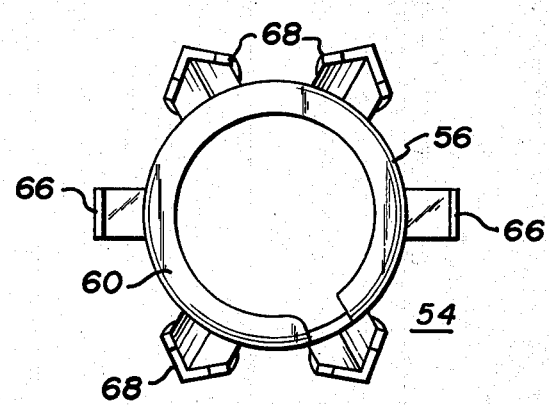
FIG. 4 is a top plan view of the core member of the connector of FIG. 1.
Figure 5:
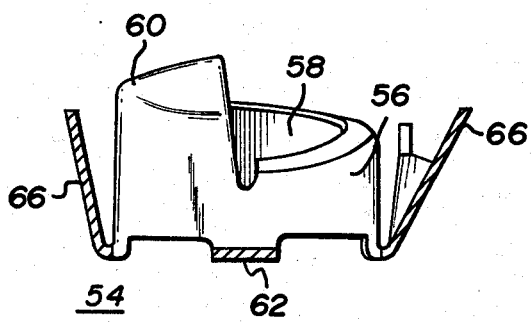
FIG. 5 is a side elevational view, partly in section, of the core member of the connector of FIG. 1.
Figure 6:
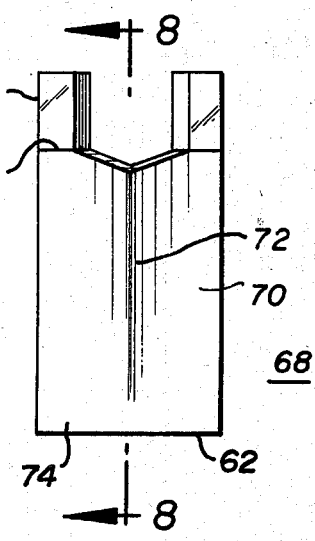
FIG. 6 is a front elevational view of a locking tongue of the core member of FIG. 5.
Figure 7:
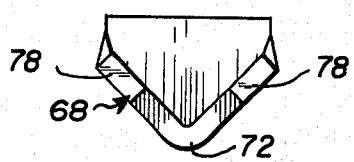
FIG. 7 is a top plan view of the locking tongue of FIG. 6.
Figure 8:
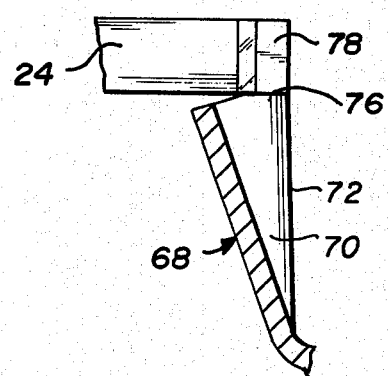
FIG. 8 is a side elevational view, in section, of the locking tongue of FIG. 6 taken along the lines 8—8.
Figure 9:
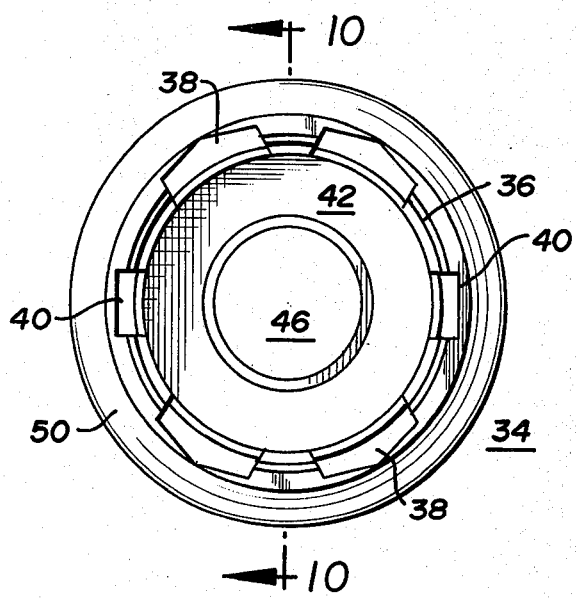
FIG. 9 is a top plan view of the shell of the connector of FIG. 1.
Figure 10:
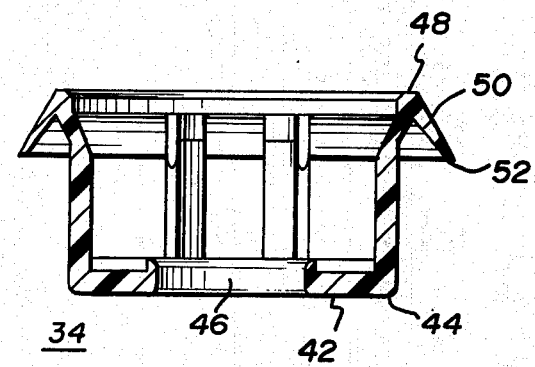
FIG. 10 is a side elevational view, in section, of the shell of FIG. 9 taken along the lines 10—10.
Figure 11:
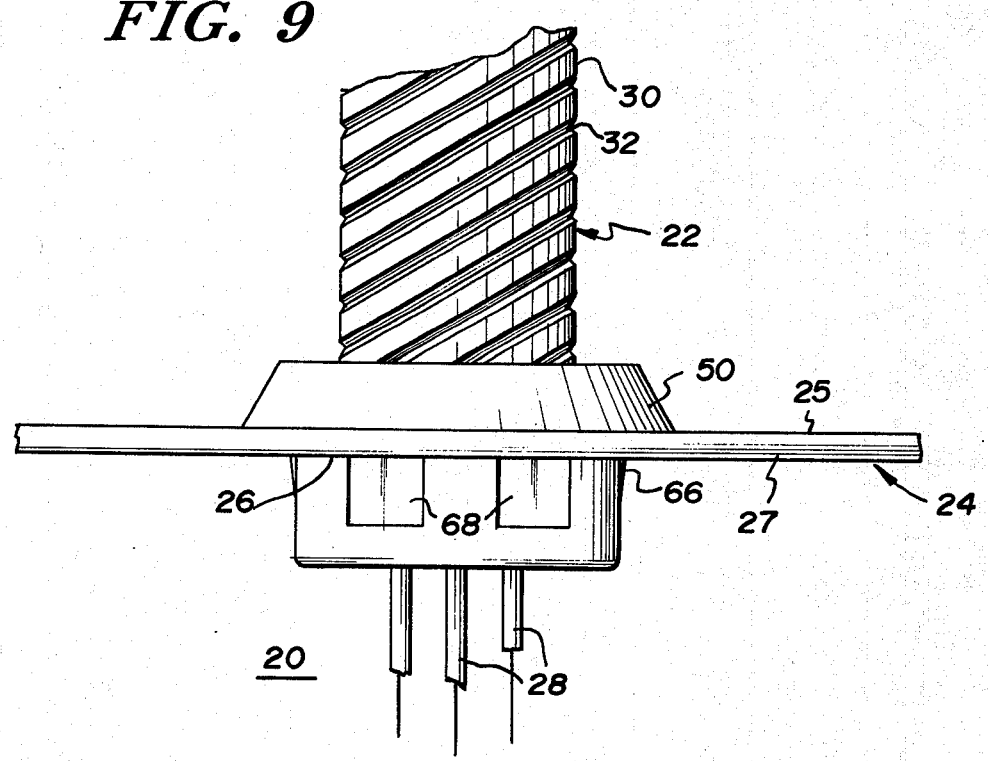
FIG. 11 is a side elevational view of the connector of FIG. 1 installed to an electrical enclosure and a flexible metallic raceway.

Placed within the shell 34 is a core member 54 best seen in FIGS. 4 and 5. Core member 54 has a central cylindrical portion 56 having a longitudinal passageway 58 therethrough. Along the edge of cylindrical portion 56 is an inwardly directed rib 60 providing a portion of one turn of a helix. The rib 60 is pitched and arranged to engage the voids 32 between adjacent convolutions 30 of the raceway 22 on the outer surface thereof. The raceway 22 is cut square across and will permit approximately one convolution to be contained in the area of rib 60. Adjacent the opposite end 62 of core member 54 are a plurality of fingers. As is best seen in FIG. 4, two fingers provide latching means 66 which extend through the windows 40 in the shell 34 and engage the underside of lip 50 to hold the core member 54 in assembly with the shell 34 (See FIG. 2 and 3).

A second plurality of fingers provide locking tongues 68 which extend through the windows 38 to provide locking engagement to the underside 27 of enclosure 24. The locking tongues 68 have a central portion 70 bent along a center line 72 (See FIG. 6) to form a generally right angle bend (See FIG. 7). The central portion 70 terminates at a first end 74 where it is coupled to the cylindrical portions 56 at end 62 and at a second end 76 in two tabs 78 which act as stops to limit the outward deflection of the locking tongues 68. The metal of the enclosure wall engages the tabs 78 and prevents their deflection such that the connector 20 could be easily withdrawn. The bent shape of the tongues 68 gives maximum strength and rigidity and covers the most area of the surface 27.

Figure 12:
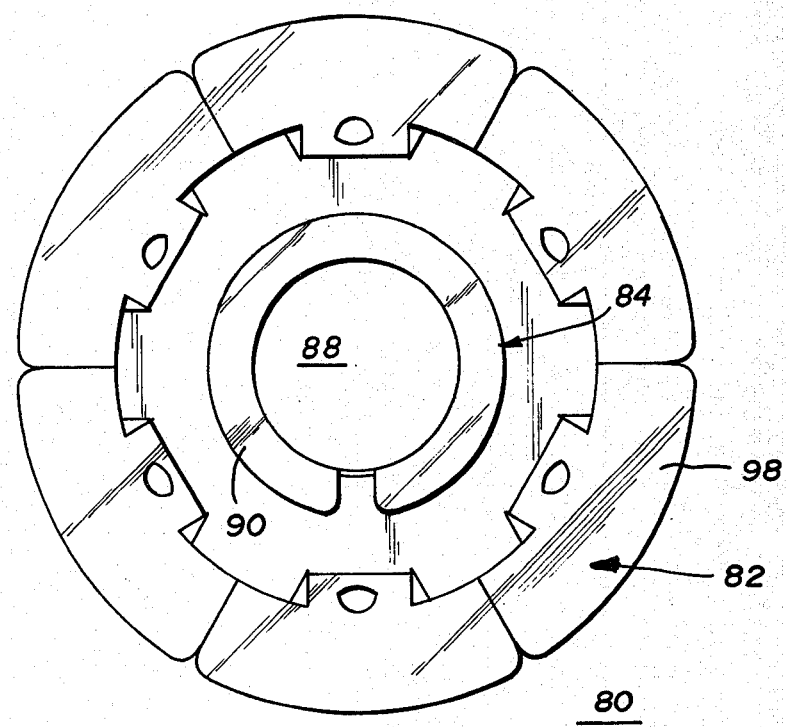
FIG. 12 is a top plan view of a further connector constructed in accordance with the concepts of the invention.
Figure 13:
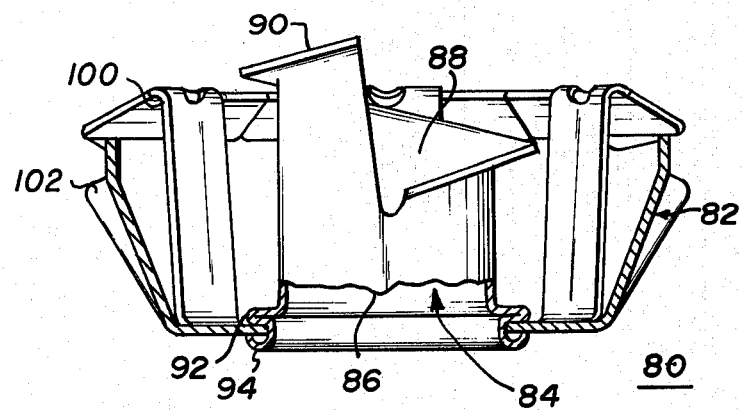
FIG. 13 is a side elevation, in section, of the connector of FIG. 12.
Figure 14:
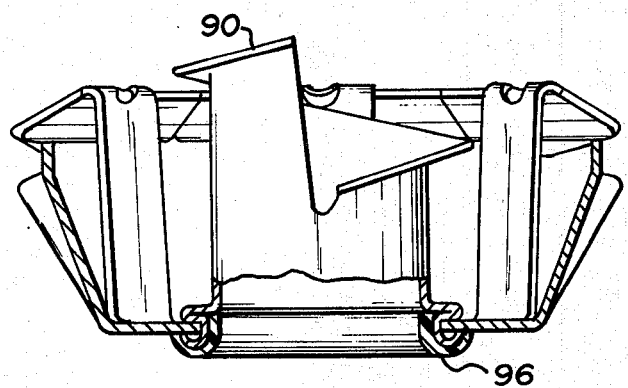
FIG. 14 is a modification of the embodiment of FIG. 12.

A second embodiment of the connector 80 makes use of a metallic shell 82, as well as a metallic core member 84, as is shown in FIGS. 12, 13 and 14. Core member 84 has a central cylindrical portion 86 through which passes a longitudinal passageway 88 and about which is placed an externally directed rib 90 of at least a portion of a single helical turn. The outwardly extending rib 90 engages with the voids on the interior of a flexible metallic raceway and encloses most of a convolution as did rib 60 of FIG. 5. The opposite end of the cylindrical portion 86 from that having rib 90 is formed with an annular rib 92 to limit insertion of the core member 84 into shell 82 (see FIG. 13). The end of the core member 84 is then rolled over as at 94 to unite core member 84 with shell 82. If desired, a throat 96 can be added, as shown in FIG. 14, to protect the insulation of conductors passing through connector 80 from any burrs created by the rolling operation.

The shell 82 has a number of segments 98 formed at its first end 100 formed outwardly and downwardly as was true of lip 50 of shell 34. A series of lanced locking tongues 102 are formed to engage the back surface 27 of enclosure 24 and function as the tongues 68 of FIG. 11. The functioning of connector 80 in all other respects is similar to that of connector 20 of FIGS. 1 to 11.

The metal to metal contact of connector 80 gives good mechanical strength and good grounding qualities where a moisture seal is not required. The continuous lip 50 of the connector 20 provides a moisture seal and, also, because of its resilience, provides a consistant grip on the enclosure 24 wall.

The embodiments of the invention in which an exclusive property or privilege is claimed are defined as follows:

1. A connector for coupling a flexible metallic raceway to an electrical enclosure or similar structure comprising: cylindrical core means having a first end and a second end and having a longitudinal passage therethrough; rib means coupled to said core means at said first end and extending inwardly into said longitudinal passage of said core means; said rib means defining at least a portion of a helix into which a portion of a flexible metallic raceway is placed, said rib means extending into the voids between adjacent convolutions of such flexible metallic raceway to couple mechanically and electrically said core means to said flexible metallic raceway; at least two tongue means coupled to said core means extending outwardly from said core means; shell means having a first and a second end and an aperture therethrough, said aperture in said shell means communicating with said longitudinal passage of said core means; lip means coupled to said first end of said shell means and extending outwardly therefrom to engage one surface of the wall of an electrical enclosure about a knock-out in said enclosure wall into which said connector is placed; at least two apertures in said shell means intermediate said first and said second ends of said shell means, one for each of said tongue means; each of said tongue means extending through its associated one of said apertures in said shell means, the free ends of each of said tongue means engaging the opposite surface of the wall of the electrical enclosure into which said connector is placed to prevent the unwanted withdrawal of the connector; and means to couple said core means to said shell means.

2. A connector for coupling a flexible metallic raceway to an electrical enclosure or similar structure comprising: cylindrical core means having a first end and a second end and having a longitudinal passage therethrough; rib means coupled to said core means at said first end and extending inwardly into said longitudinal passage of said core means; said rib means defining at least a portion of a helix into which a portion of a flexible metallic raceway is placed, said rib means extending into the voids between adjacent convolutions of such flexible metallic raceway to couple mechanically and electrically said core means to said flexible metallic raceway; shell means having a first end and a second end and having an aperture therethrough, said aperture in said shell means communicating with said longitudinal passage of said core means; lip means coupled to said first end of said shell means and extending outwardly therefrom to engage one surface of the wall of an electrical enclosure about a knock-out in said enclosure wall into which said connector is placed; tab means on said shell means extending outwardly towards said shell means first end and outwardly from said shell means, the free ends of said tab means engaging the opposite surface of the wall of the electrical enclosure into which said connector is placed to prevent the unwanted withdrawal of the connector; said core means second end extending through said aperture in said shell means and extending beyond said shell means second end; said core means being coupled to said shell means by rolling over a portion of said core means second end about said shell second end adjacent said aperture; and throat means coupled to the material of said core means about one end of said longitudinal passage therethrough and extending over the rolled portion of said core means.

3. A connector for coupling a flexible metallic raceway to an electrical enclosure or similar structure comprising: cylindrical core means having a first end and a second end and having a longitudinal passage therethrough; rib means coupled to said core means at said first end and extending inwardly into said longitudinal passage of said core means; said rib means defining at least a portion of a helix into which a portion of a flexible metallic raceway is placed, said rib means extending into the voids between adjacent convolutions of such flexible metallic raceway to couple mechanically and electrically said core means to said flexible metallic raceway; shell means having a first end and a second end and an aperture therethrough, said aperture in said shell means communicating with said longitudinal passage of said core means; lip means coupled to said first end of said shell means and extending outwardly therefrom to engage one surface of the wall of an electrical enclosure about a knock-out in said enclosure wall into which said connector is placed; said shell means having at least two slots therein and said core means having at least two latch means thereon, one latch means for each slot in said shell means and associated therewith on a one to one basis; said latch means each extending through its associated slot in said shell means to latch said core means and said shell means together and tab means on said core means to engage the opposite surface of the wall of the electrical enclosure into which said connector is placed to prevent the unwanted removal of the connector.

4. A connector as defined in claim 3, wherein said shell means is fabricated from resilient material and said lip means is a continuous surface about said connector, said lip means free end bearing against said material of said electrical enclosure to keep said tab means in contact with said opposite surface of said electrical enclosure.

* * * * *

UNITED STATES PATENT OFFICE
CERTIFICATE OF CORRECTION

Patent No. 3,993,333           Dated November 23, 1976

Inventor(s) Ranjit Biswas

It is certified that error appears in the above-identified patent and that said Letters Patent are hereby corrected as shown below:

Column 1, line 14, "are" should read -- was --.

Signed and Sealed this

Eighth Day of March 1977

[SEAL]

Attest:

RUTH C. MASON
*Attesting Officer*

C. MARSHALL DANN
*Commissioner of Patents and Trademarks*